US011957155B2

(12) United States Patent
Mironov et al.

(10) Patent No.: US 11,957,155 B2
(45) **Date of Patent: *Apr. 16, 2024**

(54) AEROSOL-FORMING SUBSTRATE AND AEROSOL-DELIVERY SYSTEM

(71) Applicant: PHILIP MORRIS PRODUCTS S.A., Neuchatel (CH)

(72) Inventors: Oleg Mironov, Neuchatel (CH); Ihar Nikolaevich Zinovik, Peseux (CH)

(73) Assignee: Philip Morris Products S.A., Neuchatel (CH)

(*) Notice: Subject to any disclaimer, the term of this patent is extended or adjusted under 35 U.S.C. 154(b) by 947 days.

This patent is subject to a terminal disclaimer.

(21) Appl. No.: 16/433,060

(22) Filed: Jun. 6, 2019

(65) Prior Publication Data

US 2019/0320720 A1 Oct. 24, 2019

Related U.S. Application Data

(63) Continuation of application No. 14/899,745, filed as application No. PCT/EP2015/061217 on May 21, 2015, now Pat. No. 11,317,648.

(30) Foreign Application Priority Data

May 21, 2014 (EP) .................................... 14169192

(51) Int. Cl.

*A24B 15/12* (2006.01)
*A24D 1/20* (2020.01)
(Continued)

(52) U.S. Cl.

CPC ................ *A24B 15/12* (2013.01); *A24D 1/20* (2020.01); *A24F 40/465* (2020.01); *H05B 6/108* (2013.01);
(Continued)

(58) Field of Classification Search

None

See application file for complete search history.

(56) References Cited

U.S. PATENT DOCUMENTS

| | | | |
|---|---|---|---|
| 4,256,945 | A | 3/1981 | Carter |
| 5,269,327 | A | 12/1993 | Counts |

(Continued)

FOREIGN PATENT DOCUMENTS

| | | |
|---|---|---|
| CN | 102014677 | 4/2011 |
| EP | 2444112 | 4/2012 |
| WO | WO 95/27411 | 10/1995 |

OTHER PUBLICATIONS

Office Action issued in India for Application No. 201617026827 dated Nov. 13, 2019 (7 pages). English translation included.

(Continued)

*Primary Examiner* — Phu H Nguyen
(74) *Attorney, Agent, or Firm* — Mueting Raasch Group

(57) ABSTRACT

There is described an aerosol-forming substrate for use in combination with an inductive heating device. The aerosol-forming substrate comprises a solid material which is capable of releasing volatile compounds that can form an aerosol upon heating of the aerosol-forming substrate and at least a first susceptor material for heating the aerosol-forming substrate. The at least first susceptor material is arranged in thermal proximity of the solid material. The aerosol-forming substrate further comprises at least a second susceptor material which has a second Curie-temperature which is lower than a first Curie-temperature of the first susceptor material. The second Curie-temperature of the second susceptor material corresponds to a predefined maximum heating temperature of the first susceptor material. There is also described an aerosol-delivery system.

16 Claims, 2 Drawing Sheets

(51) Int. Cl.
*A24F 40/20* (2020.01)
*A24F 40/465* (2020.01)
*H05B 6/10* (2006.01)
*H05B 6/38* (2006.01)

(52) U.S. Cl.
CPC ................ *H05B 6/38* (2013.01); *A24F 40/20* (2020.01); *H05B 2206/023* (2013.01)

(56) References Cited

U.S. PATENT DOCUMENTS

| | | | | | |
|---|---|---|---|---|---|
| 5,613,505 | A | * | 3/1997 | Campbell .............. | H05B 6/365<br>131/194 |
| 5,911,898 | A | * | 6/1999 | Jacobs ................... | H05B 6/106<br>219/505 |
| 6,681,998 | B2 | | 1/2004 | Sharpe | |
| 8,794,231 | B2 | | 8/2014 | Thorens | |
| 2002/0113066 | A1 | | 8/2002 | Stark | |
| 2008/0006796 | A1 | * | 1/2008 | Khatua ................ | H01H 71/142<br>252/500 |
| 2011/0290629 | A1 | | 12/2011 | Shimizu | |
| 2013/0042865 | A1 | | 2/2013 | Monsees | |

OTHER PUBLICATIONS

PCT Search Report and Written Opinion for PCT/EP2015/061217 dated Sep. 10, 2015 (9 pages).
PCT Search Report and Written Opinion for PCT/EP2015/061218 dated Sep. 8, 2015 (9 pages).
PCT Search Report and Written Opinion for PCT/EP2015/061219 dated Sep. 8, 2015 (11 pages).

* cited by examiner

AEROSOL-FORMING SUBSTRATE AND AEROSOL-DELIVERY SYSTEM

This application is a continuation application of U.S. application Ser. No. 14/899,745, filed Dec. 18, 2015 and which is a U.S. National Stage Application of International Application No. PCT/EP2015/061217, filed May 21, 2015, which was published in English on Nov. 26, 2015 as International Patent Publication WO 2015/177263. International Application No. PCT/EP2015/061217 claims priority to European Application No. 14169192.3 filed May 21, 2014. A certified copy of European Application No. 14169192.3 filed May 21, 2014, was provided in, and is available in, U.S. patent application Ser. No. 14/899,745 for which certified copy is available in PAIR.

The present invention relates to an aerosol-forming substrate for use in combination with an inductive heating device. The present invention also relates to an aerosol-delivery system.

From the prior art aerosol-delivery systems are known, which comprise an aerosol-forming substrate and an inductive heating device. The inductive heating device comprises an induction source which produces an alternating electromagnetic field which induces a heat generating eddy current in a susceptor material. The susceptor material is in thermal proximity of the aerosol-forming substrate. The heated susceptor material in turn heats the aerosol-forming substrate which comprises a material which is capable of releasing volatile compounds that can form an aerosol. A number of embodiments for aerosol-forming substrates have been described in the art which are provided with diverse configurations for the susceptor material in order to ascertain an adequate heating of the aerosol-forming substrate. Thus, an operating temperature of the aerosol-forming substrate is strived for at which the release of volatile compounds that can form an aerosol is satisfactory.

However, it would be desirable to be able to control the operating temperature of the aerosol-forming substrate in an efficient manner.

According to one aspect of the invention an aerosol-forming substrate for use in combination with an inductive heating device is provided. The aerosol-forming substrate comprises a solid material which is capable of releasing volatile compounds that can form an aerosol upon heating of the aerosol-forming substrate and at least a first susceptor material for heating the aerosol-forming substrate. The at least first susceptor material is arranged in thermal proximity of the solid material. The aerosol-forming substrate further comprises at least a second susceptor material which has a second Curie-temperature which is lower than a first Curie-temperature of the first susceptor material. The second Curie-temperature of the second susceptor material corresponds to a predefined maximum heating temperature of the first susceptor material.

By providing at least a first and a second susceptor material having first and second Curie-temperatures distinct from one another, the heating of the aerosol-forming substrate and the temperature control of the heating may be separated. While the first susceptor material may be optimized with regard to heat loss and thus heating efficiency, the second susceptor material may be optimized in respect of temperature control. The second susceptor material need not have any pronounced heating characteristic. The second susceptor material has a second Curie-temperature which corresponds to a predefined maximum heating temperature of the first susceptor material. The maximum heating temperature may be defined such, that a local burning of the solid material is avoided. The first susceptor material, which may be optimized for the heating may have a first Curie-temperature which is higher than the predefined maximum heating temperature. The separation of the heating and the temperature control functions allows for an optimization of the concentrations of the at least first and second susceptor materials, respectively, with regard to the amount of aerosol-forming substrate. Thus, e.g., a concentration by weight of the second susceptor material, which serves as a tool for temperature control may be selected lower than a concentration by weight of the first susceptor material whose primary function is the heating of the aerosol-forming substrate. The separation of the heating and the temperature control functions further allows for an optimization of the distribution of the at least first and second susceptor materials within or about the aerosol-forming substrate in accordance with specific requirements, such as, e.g. formulation and or packing density of the solid material. Once the second susceptor material has reached its second Curie-temperature, its magnetic properties change. At the second Curie-temperature the second susceptor material reversibly changes from a ferromagnetic phase to a paramagnetic phase. During the inductive heating of the aerosol-forming substrate this phase-change of the second susceptor material may be detected on-line and the inductive heating may be stopped automatically. Thus, an overheating of the aerosol-forming substrate may be avoided, even though the first susceptor material which is responsible for the heating of the aerosol-forming substrate has a first Curie-temperature which is higher than the predefined maximum heating temperature. After the inductive heating has been stopped the second susceptor material cools down until it reaches a temperature lower than its second Curie-temperature at which it regains its ferromagnetic properties again. This phase-change may be detected on-line and the inductive heating may be activated again. Thus, the inductive heating of the aerosol-forming substrate corresponds to a repeated activation and deactivation of the inductive heating device. The temperature control is accomplished contactless. Besides a circuitry and an electronics which is preferably already integrated in the inductive heating device there is no need for any additional circuitry and electronics.

The aerosol-forming substrate is preferably a solid material capable of releasing volatile compounds that can form an aerosol. The term solid as used herein encompasses solid materials, semi-solid materials, and even liquid components, which may be provided on a carrier material. The volatile compounds are released by heating the aerosol-forming substrate. The aerosol-forming substrate may comprise nicotine. The nicotine containing aerosol-forming substrate may be a nicotine salt matrix. The aerosol-forming substrate may comprise plant-based material. The aerosol-forming substrate may comprise tobacco, and preferably the tobacco containing material contains volatile tobacco flavour compounds, which are released from the aerosol-forming substrate upon heating. The aerosol-forming substrate may comprise homogenised tobacco material. Homogenised tobacco material may be formed by agglomerating particulate tobacco. The aerosol-forming substrate may alternatively comprise a non-tobacco-containing material. The aerosol-forming substrate may comprise homogenised plant-based material.

The aerosol-forming substrate may comprise at least one aerosol-former. The aerosol-former may be any suitable known compound or mixture of compounds that, in use, facilitates formation of a dense and stable aerosol and that is substantially resistant to thermal degradation at the operating temperature of the inductive heating device. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Particularly preferred aerosol formers are polyhydric alcohols or mixtures thereof, such as triethylene glycol, 1,3-butanediol and, most preferred, glycerine.

The aerosol-forming substrate may comprise other additives and ingredients, such as flavourants. The aerosol-forming substrate preferably comprises nicotine and at least one aerosol-former. In a particularly preferred embodiment, the aerosol-former is glycerine. The susceptor materials being in thermal proximity of the aerosol-forming substrate allow for a more efficient heating and thus, higher operating temperatures may be reached. The higher operating temperature enables glycerine to be used as an aerosol-former which provides an improved aerosol as compared to the aerosol-formers used in the known systems.

In an embodiment of the aerosol-forming substrate according to the invention the second Curie-temperature of the second susceptor material may be selected such that upon being inductively heated an overall average temperature of the aerosol-forming substrate does not exceed 240° C. The overall average temperature of the aerosol-forming substrate here is defined as the arithmetic mean of a number of temperature measurements in central regions and in peripheral regions of the aerosol-forming substrate. By pre-defining a maximum for the overall average temperature the aerosol-forming substrate may be tailored to an optimum production of aerosol.

In another embodiment of the aerosol-forming substrate the second Curie-temperature of the second susceptor material is selected such that is does not exceed 370° C., in order to avoid a local overheating of the aerosol-forming substrate comprising the solid material which is capable of releasing volatile compounds that can form an aerosol.

In accordance with another aspect of the invention the first and second susceptor materials comprised in the aerosol-forming substrate may be of different geometrical configurations. Thus, at least one of the first and second susceptor materials, respectively, may be of one of particulate, or filament, or mesh-like configuration. By having different geometrical configurations, the first and second susceptor materials may be tailored to their specific function. Thus, e.g., a first susceptor material which has a heating function may have a geometrical configuration which presents a large surface area to the solid material which is capable of releasing volatile compounds that can form an aerosol, in order to enhance the heat transfer. The second susceptor material which has a temperature control function does not have to have a very large surface area. By having different geometrical configurations the first and second susceptor materials, respectively, may be arranged with regard to the solid material comprised in the aerosol-forming substrate such, that they may perform their specific tasks in an optimum manner.

Thus, in an embodiment of the aerosol-forming substrate according to the invention at least one of the first and second susceptor materials, respectively, may be of particulate configuration. The particles preferably have an equivalent spherical diameter of 10 μm-100 μm and are distributed throughout the aerosol-forming substrate. The equivalent spherical diameter is used in combination with particles of irregular shape and is defined as the diameter of a sphere of equivalent volume. At the selected sizes the particles may be distributed throughout the aerosol-forming substrate as required and they may be securely retained within aerosol-forming substrate. The particles may be distributed about homogeneously, or they may have a distribution gradient e.g. from a central axis of the aerosol-forming substrate to the periphery thereof, or they may be distributed throughout the aerosol-forming substrate with local concentration peaks.

In another embodiment of the aerosol-forming substrate the first and second susceptor materials, both, may be of particulate configuration and may be assembled to form a unitary structure. In this context the expression "assembled to form a unitary structure" may include an agglomeration of the particulate first and second susceptor materials to granules of regular or irregular shape, having equivalent spherical diameters larger than those of the particulate first and second susceptor materials, respectively. It may also include a more or less homogeneous mixing of the particulate first and second susceptor materials, respectively, and compressing and optionally sintering of the compressed particle mixture to a single filament or wire structure. The immediate proximity of the particulate first and second susceptor materials may be of advantage with regard to an even more exact temperature control.

In a further embodiment of the aerosol-forming substrate at least one of the first and second susceptor materials, respectively, may be of a filament configuration and may be arranged within the aerosol-forming substrate. In yet another embodiment the first or second susceptor material of filament shape may extend within the aerosol-forming substrate. Filament structures may have advantages with regard to their manufacture, and their geometrical regularity and reproducibility. The geometrical regularity and reproducibility may prove advantageous in both, temperature control and controlled local heating.

In another embodiment of the aerosol-forming substrate according to the invention at least one of the first and second susceptor materials may be of a mesh-like configuration which is arranged inside of the aerosol-forming substrate. Alternatively, the susceptor material of mesh-like configuration may at least partially form an encasement for the solid material. The term "mesh-like configuration" includes layers having discontinuities therethrough. For example the layer may be a screen, a mesh, a grating or a perforated foil.

In yet another embodiment of the aerosol-forming substrate the first and second susceptor materials may be assembled to form a mesh-like structural entity. The mesh-like structural entity may, e.g., extend axially within the aerosol-forming substrate. Alternatively the mesh-like structural entity of first and second susceptor materials may at least partially form an encasement for the solid material. The term "mesh-like structure" designates all structures which may be assembled from the first and second susceptor materials and have discontinuities therethrough, including screens, meshes, gratings or a perforated foil.

While in the afore-mentioned embodiments of the aerosol-forming substrate the first and second susceptor materials may be of a geometrical configuration distinct from each other, it may be desirable, e.g. for manufacturing purposes of the aerosol-forming substrate, that the first and second susceptor materials are of similar geometrical configuration.

In another embodiment of the invention the aerosol-forming substrate may be of a generally cylindrical shape and be enclosed by a tubular casing, such as, e.g., an overwrap. The tubular casing, such as, e.g. the overwrap, may help to stabilize the shape of the aerosol-forming substrate and to prevent an accidental disassociation of the solid material which is capable of releasing volatile compounds that can form an aerosol, and the first and second susceptor materials.

The aerosol-forming substrate may be attached to a mouthpiece, which optionally may comprise a filter plug. The aerosol-forming substrate comprising the solid material which is capable of releasing volatile compounds that can form an aerosol upon heating of the aerosol-forming substrate and the first and second susceptor materials, and the mouthpiece may be assembled to form a structural entity. Every time a new aerosol-forming substrate is to be used in combination with an inductive heating device, the user is automatically provided with a new mouthpiece, which might be appreciated from a hygienic point of view. Optionally the mouthpiece may be provided with a filter plug, which may be selected in accordance with the composition of the aerosol-forming substrate.

An aerosol-delivery system according to the invention comprises an inductive heating device and an aerosol-forming substrate according to any one of the afore-described embodiments. With such an aerosol-delivery system an overheating of the aerosol-forming substrate may be avoided. Both, the inductive heating and the temperature control of the aerosol-forming substrate, may be accomplished contactless. The circuitry and the electronics which may already be integrated in the inductive heating device for controlling the inductive heating of the aerosol-forming substrate at the same time may be used for the temperature control thereof.

In another embodiment of the aerosol-delivery system the inductive heating device may be equipped with an electronic control circuitry, which is adapted for a closed-loop control of the heating of the aerosol forming substrate. Thus, once the second susceptor material, which performs the function of temperature control, has reached its second Curie-temperature where it changes its magnetic properties from ferromagnetic to paramagnetic, the heating may be stopped. When the second susceptor material has cooled down to a temperature below its second Curie-temperature where its magnetic properties change back again from paramagnetic to ferromagnetic, the inductive heating of the aerosol-forming substrate may be automatically continued again. Thus, with the aerosol-delivery system according to the invention the heating of the aerosol-forming substrate may be performed at a temperature which oscillates between the second Curie-temperature and that temperature below the second Curie-temperature, at which the second susceptor material regains its ferromagnetic properties.

The aerosol-forming substrate may be releasably held within a heating chamber of the inductive heating device such, that a mouthpiece, which may be attached to the aerosol-forming substrate, at least partially protrudes from the inductive heating device. The aerosol-forming substrate and the mouthpiece may be assembled to form a structural entity. Every time a new aerosol-forming substrate is inserted into the heating chamber of the inductive heating device, the user automatically is provided with a new mouthpiece.

The afore-described embodiments of the aerosol-forming substrate and of the aerosol-delivery system will become more apparent from the following detailed description, reference being made to the accompanying schematic drawings which are not to scale, in which.

Inductive heating is a known phenomenon described by Faraday's law of induction and Ohm's law. More specifically, Faraday's law of induction states that if the magnetic induction in a conductor is changing, a changing electric field is produced in the conductor. Since this electric field is produced in a conductor, a current, known as an eddy current, will flow in the conductor according to Ohm's law. The eddy current will generate heat proportional to the current density and the conductor resistivity. A conductor which is capable of being inductively heated is known as a susceptor material. The present invention employs an inductive heating device equipped with an inductive heating source, such as, e.g., an induction coil, which is capable of generating an alternating electromagnetic field from an AC source such as an LC circuit. Heat generating eddy currents are produced in the susceptor material which is in thermal proximity to a solid material which is capable of releasing volatile compounds that can form an aerosol upon heating of the aerosol-forming substrate and which is comprised in an aerosol-forming substrate. The term solid as used herein encompasses solid materials, semi-solid materials, and even liquid components, which may be provided on a carrier material. The primary heat transfer mechanisms from the susceptor material to the solid material are conduction, radiation and possibly convection.

Figure 1:
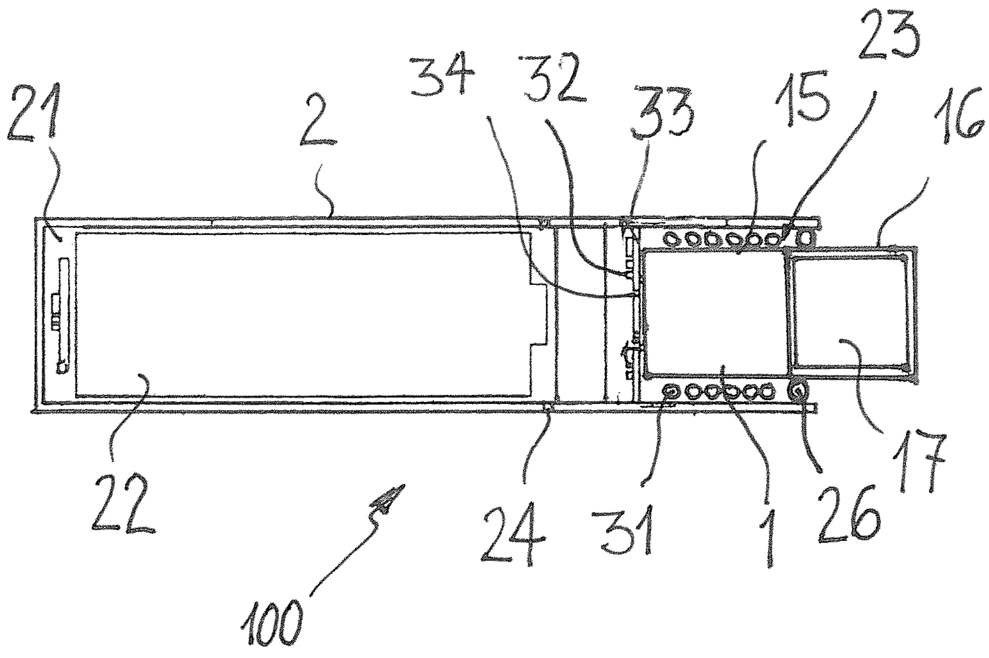
FIG. 1 is a schematic drawing of an aerosol-delivery system comprising an inductive heating device and an aerosol-forming substrate inserted into a heating chamber.

In schematic FIG. 1 an exemplary embodiment of an aerosol-delivery system according to the invention is generally designated with reference numeral 100. The aerosol-delivery system 100 comprises an inductive heating device 2 and an aerosol-forming substrate 1 associated therewith. The inductive heating device 2 may comprise an elongated tubular housing 20 having an accumulator chamber 21 for accommodating an accumulator 22 or a battery, and a heating chamber 23. The heating chamber 23 may be provided with an inductive heating source, which, as shown in the depicted exemplary embodiment, may be constituted by an induction coil 31 which is electrically connected with an electronic circuitry 32. The electronic circuitry 32 may e.g. be provided on a printed circuit board 33 which delimits an axial extension of the heating chamber 23. The electric power required for the inductive heating is provided by the accumulator 22 or the battery which is accommodated in the accumulator chamber 21 and which is electrically connected with the electronic circuitry 32. The heating chamber 23 has an internal cross-section such that the aerosol-forming substrate 1 may be releasably held therein and may easily be removed and replaced with another aerosol-forming substrate 1 when desired.

The aerosol-forming substrate 1 may be of a generally cylindrical shape and may be enclosed by a tubular casing 15, such as, e.g., an overwrap. The tubular casing 15, such as, e.g. the overwrap, may help to stabilize the shape of the aerosol-forming substrate 1 and to prevent an accidental loss of the contents of the aerosol-forming substrate 1. As shown in the exemplary embodiment of the aerosol-delivery system 100 according to the invention, the aerosol-forming substrate 1 may be connected to a mouthpiece 16, which with the aerosol-forming substrate 1 inserted into the heating chamber 23 at least partly protrudes from the heating chamber 23. The mouthpiece 16 may comprise a filter plug 17 filter plug, which may be selected in accordance with the composition of the aerosol-forming substrate 1. The aerosol-forming substrate 1 and the mouthpiece 16 may be assembled to form a structural entity. Every time a new aerosol-forming substrate 1 is to be used in combination with the inductive heating device 2, the user is automatically provided with a new mouthpiece 16, which might be appreciated from a hygienic point of view.

As shown in FIG. 1 the induction coil 31 may be arranged in a peripheral region of the heating chamber 23, in vicinity of the housing 20 of the inductive heating device 2. The windings of the induction coil 31 enclose a free space of the heating chamber 23 which is capable to accommodate the aerosol-forming substrate 1. The aerosol-forming substrate 1 may be inserted into this free space of the heating chamber 23 from an open end of the tubular housing 20 of the inductive heating device 2 until it reaches a stop, which may be provided inside the heating chamber 23. The stop may be constituted by at least one lug protruding from an inside wall of the tubular housing 20, or it may be constituted by the printed circuit board 33, which delimits the heating chamber 23 axially, as it is shown in the exemplary embodiment depicted in FIG. 1. The inserted aerosol-forming substrate 1 may be releasably held within the heating chamber 23 e.g. by an annular sealing gasket 26, which may be provided in vicinity of the open end of the tubular housing 20.

The aerosol-forming substrate 1 and the optional mouthpiece 16 with the optional filter plug 17 are pervious to air. The inductive heating device 2 may comprise a number of vents 24, which may be distributed along the tubular housing 20. Air passages 34 which may be provided in the printed circuit board 33 enable airflow from the vents 24 to the aerosol-forming substrate 1. It should be noted, that in alternative embodiments of the inductive heating device 2 the printed circuit board 33 may be omitted such that air from the vents 24 in the tubular housing 20 may reach the aerosol-forming substrate 1 practically unimpeded. The inductive heating device 2 may be equipped with an air flow sensor (not shown in FIG. 1) for activation of the electronic circuitry 32 and the induction coil 31 when incoming air is detected. The air flow sensor may e.g. be provided in vicinity of one of the vents 24 or of one of the air passages 34 of the printed circuit board 33. Thus, a user may suck at the mouthpiece 16, in order to initiate the induction heating of the aerosol-forming substrate 1 Upon heating an aerosol, which is released by the solid material comprised in the aerosol-forming substrate 1, may be inhaled together with air which is sucked through the aerosol-forming substrate 1.

Figure 2:
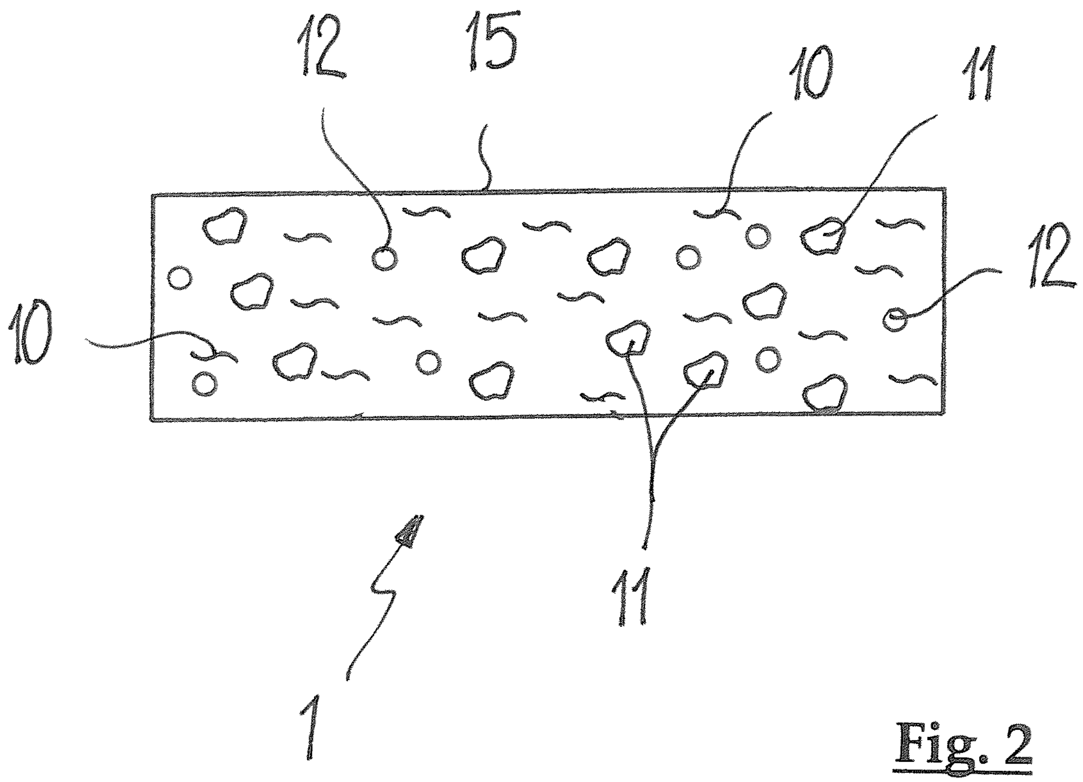
FIG. 2 shows a first embodiment of an aerosol-forming substrate with first and second susceptor materials of particulate configuration.

FIG. 2 schematically shows a first embodiment of an aerosol-forming substrate which is generally designated with reference numeral 1. The aerosol-forming substrate 1 may comprise a generally tubular casing 15, such as, e.g., an overwrap. The tubular casing 15 may be made of a material which does not noticeably impede an electromagnetic field reaching the contents of the aerosol-forming substrate 1. E.g. the tubular casing 15 may be a paper overwrap. Paper has a high magnetic permeability and in an alternating electromagnetic field is not heated by eddy currents. The aerosol-forming substrate 1 comprises a solid material 10 which is capable of releasing volatile compounds that can form an aerosol upon heating of the aerosol-forming substrate 1 and at least a first susceptor material 11 for heating the aerosol-forming substrate 1. In addition to the first susceptor material 11 the aerosol-forming substrate 1 further comprises at least a second susceptor material 12. The second susceptor material 12 has a second Curie-temperature which is lower than a first Curie-temperature of the first susceptor material 11. Thus, upon inductive heating of the aerosol-forming substrate 1 the second susceptor material 12 will reach its specific second Curie temperature first. At the second Curie-temperature the second susceptor material 12 reversibly changes from a ferromagnetic phase to a paramagnetic phase. During the inductive heating of the aerosol-forming substrate 1 this phase-change of the second susceptor material 12 may be detected on-line and the inductive heating may be stopped automatically. Thus, the second Curie-temperature of the second susceptor material 12 corresponds to a predefined maximum heating temperature of the first susceptor material 11. After the inductive heating has been stopped the second susceptor material 12 cools down until it reaches a temperature lower than its second Curie-temperature at which it regains its ferromagnetic properties again. This phase-change may be detected on-line and the inductive heating may be activated again. Thus, the inductive heating of the aerosol-forming substrate 1 corresponds to a repeated activation and deactivation of the inductive heating device. The temperature control is accomplished contactless. Besides the electronic circuitry which may already be integrated in the inductive heating device there is no need for any additional circuitry and electronics.

By providing at least first and second susceptor materials 11, 12 having first and second Curie-temperatures distinct from one another, the heating of the aerosol-forming substrate 1 and the temperature control of the inductive heating may be separated. The first susceptor material 11 may be optimized with regard to heat loss and thus heating efficiency. Thus, the first susceptor material 11 should have a low magnetic reluctance and a correspondingly high relative permeability to optimize surface eddy currents generated by an alternating electromagnetic field of a given strength. The first susceptor material 11 should also have a relatively low electrical resistivity in order to increase Joule heat dissipation and thus heat loss. The second susceptor material 12 may be optimized in respect of temperature control. The second susceptor material 12 need not have any pronounced heating characteristic. With regard to the induction heating though, it is the second Curie temperature of the second susceptor material 12, which corresponds to the predefined maximum heating temperature of the first susceptor material 11.

The second Curie-temperature of the second susceptor material 12 may be selected such that upon being inductively heated an overall average temperature of the aerosol-forming substrate 1 does not exceed 240° C. The overall average temperature of the aerosol-forming substrate 1 here is defined as the arithmetic mean of a number of temperature measurements in central regions and in peripheral regions of the aerosol-forming substrate. In another embodiment of the aerosol-forming substrate 1 the second Curie-temperature of the second susceptor material 12 may be selected such that is does not exceed 370° C., in order to avoid a local overheating of the aerosol-forming substrate 1 comprising the solid material 10 which is capable of releasing volatile compounds that can form an aerosol.

The afore-described basic composition of the aerosol-forming substrate 1 of the exemplary embodiment of FIG. 2 is common to all further embodiments of the aerosol-forming substrate 1 which will be described hereinafter.

As shown in FIG. 2 the first and second susceptor materials 11, 12 may be of particulate configuration. The first and second susceptor materials 11, 12 preferably have an equivalent spherical diameter of 10 μm-100 μm and are distributed throughout the aerosol-forming substrate. The equivalent spherical diameter is used in combination with particles of irregular shape and is defined as the diameter of a sphere of equivalent volume. At the selected sizes the particulate first and second susceptor materials 11, 12 may be distributed throughout the aerosol-forming substrate 1 as required and they may be securely retained within aerosol-forming substrate 1. The particulate susceptor materials 11, 12 may be distributed throughout the solid material 10 about homogeneously, as shown in the exemplary embodiment of the aerosol-forming substrate 1 according to FIG. 2. Alternatively, they may have a distribution gradient e.g. from a central axis of the aerosol-forming substrate 1 to the periphery thereof, or they may be distributed throughout the aerosol-forming substrate 1 with local concentration peaks.

Figure 3:
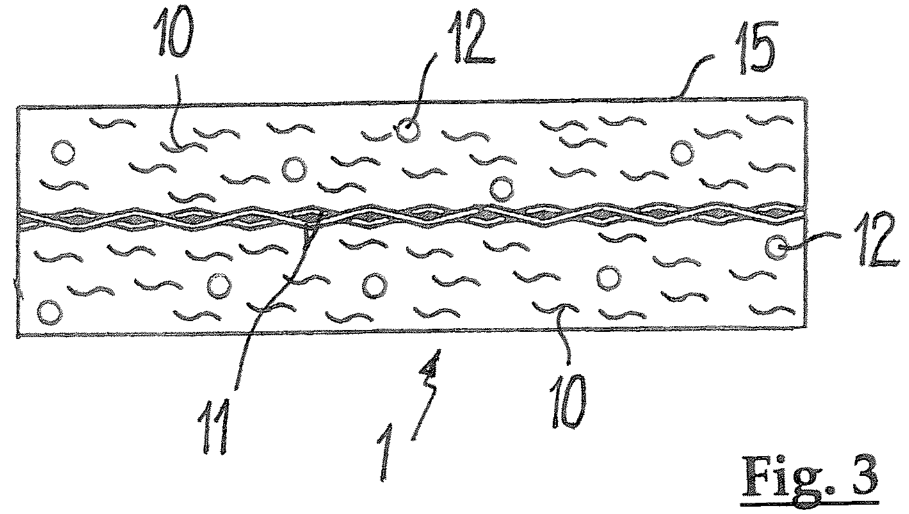
FIG. 3 shows a second embodiment of an aerosol-forming substrate with a particulate second susceptor material combined with a first susceptor material of filament configuration.

In FIG. 3 another embodiment of an aerosol-forming substrate is shown, which again bears reference numeral 1. The aerosol-forming substrate 1 may be of a generally cylindrical shape and may be enclosed by a tubular casing 15, such as, e.g., an overwrap. The aerosol-forming substrate comprises solid material 10 which is capable of releasing volatile compounds that can form an aerosol upon heating of the aerosol-forming substrate 1 and at least first and second susceptor materials 11, 12. The first susceptor material 11 which is responsible for heating the aerosol-forming substrate 1 may be of a filament configuration. The first susceptor material of filament configuration may have different lengths and diameters and may be distributed more or less homogeneously throughout the solid material. As exemplarily shown in FIG. 3 the first susceptor material 11 of filament configuration may be of a wire-like shape and may extend about axially through a longitudinal extension of the aerosol-forming substrate 1. The second susceptor material 12 may be of particulate configuration and may be distributed throughout the solid material 10. It should be noted though, that as need may be, the geometrical configuration of the first and second susceptor materials 11, 12 may be interchanged. Thus, the second susceptor material 12 may be of filament configuration and the first susceptor material 11 may be of particulate configuration.

Figure 4:
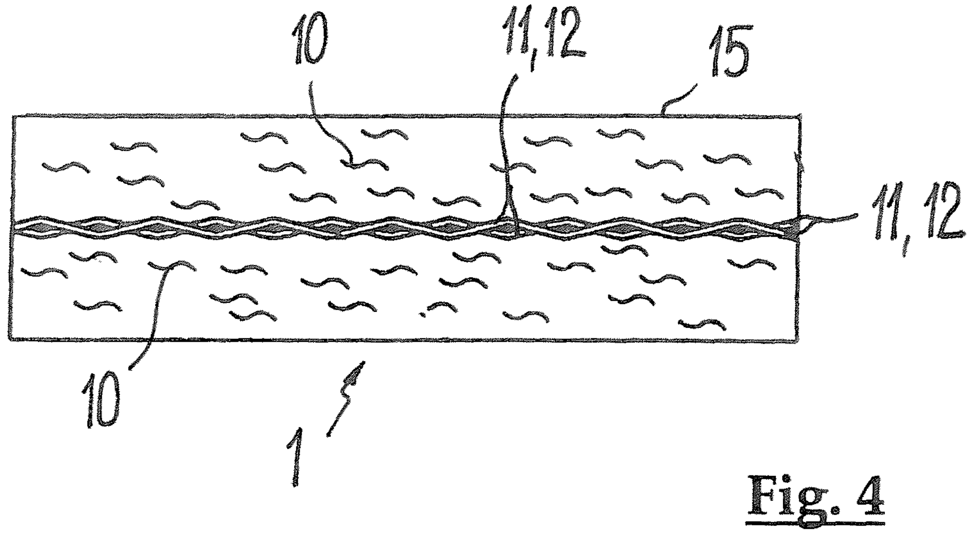
FIG. 4 shows another embodiment of an aerosol-forming substrate, in which first and second susceptor materials of particulate configuration have been assembled to form a unitary structure.

In FIG. 4 yet another exemplary embodiment of an aerosol-forming substrate is shown, which again is generally designated with reference numeral 1. The aerosol-forming substrate 1 may again be of a generally cylindrical shape and may be enclosed by a tubular casing 15, such as, e.g., an overwrap. The aerosol-forming substrate comprises solid material 10 which is capable of releasing volatile compounds that can form an aerosol upon heating of the aerosol-forming substrate 1 and at least first and second susceptor materials 11, 12. The first and second susceptor materials 11, 12 may be of particulate configuration and may be assembled to form a unitary structure. In this context the expression "assembled to form a unitary structure" may include an agglomeration of the particulate first and second susceptor materials 11, 12 to granules of regular or irregular shape, having equivalent spherical diameters larger than those of the particulate first and second susceptor materials, respectively. It may also include a more or less homogeneous mixing of the particulate first and second susceptor materials 11, 12 and compressing and optionally sintering of the compressed particle mixture to form a filament or wire structure, which may extend about axially through a longitudinal extension of the aerosol-forming substrate 1, as is shown in FIG. 4.

Figure 5:
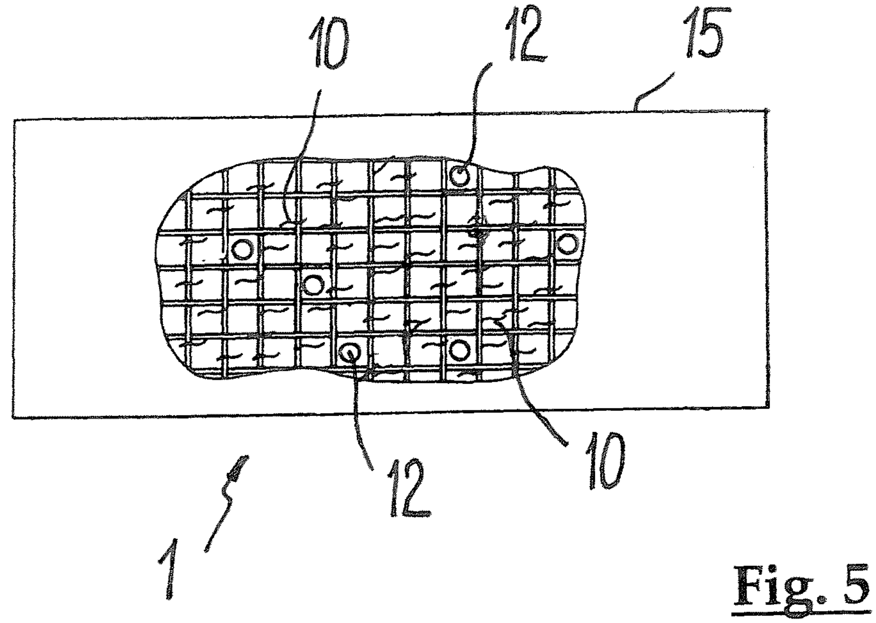
FIG. 5 shows a further embodiment of an aerosol-forming substrate with a second susceptor material of particulate material combined with a first susceptor material of mesh-like configuration.

In FIG. 5 a further exemplary embodiment of an aerosol-forming substrate is again designated generally with reference numeral 1. The aerosol-forming substrate 1 may again be of a generally cylindrical shape and may be enclosed by a tubular casing 15, such as, e.g., an overwrap. The aerosol-forming substrate comprises solid material 10 which is capable of releasing volatile compounds that can form an aerosol upon heating of the aerosol-forming substrate 1 and at least first and second susceptor materials 11, 12. The first susceptor material 11 may be of a mesh-like configuration which may be arranged inside of the aerosol-forming substrate 1 or, alternatively, may at least partially form an encasement for the solid material 10. The term "mesh-like configuration" includes layers having discontinuities therethrough. For example the layer may be a screen, a mesh, a grating or a perforated foil. The second susceptor material 12 may be of particulate configuration and may be distributed throughout the solid material 10. Again it should be noted, that, as need may be, the geometrical configuration of the first and second susceptor materials 11, 12 may be interchanged. Thus, the second susceptor material 12 may be of a mesh-like configuration and the first susceptor material 11 may be of particulate configuration.

In yet another embodiment of the aerosol-forming substrate the first and second susceptor materials 11, 12 may be assembled to form a mesh-like structural entity. The mesh-like structural entity may, e.g., extend axially within the aerosol-forming substrate. Alternatively the mesh-like structural entity of first and second susceptor materials 11, 12 may at least partially form an encasement for the solid material. The term "mesh-like structure" designates all structures which may be assembled from the first and second susceptor materials and have discontinuities therethrough, including screens, meshes, gratings or a perforated foil. The afore-described embodiment of the aerosol-forming substrate is not shown in a separate drawing, because it basically corresponds to that of FIG. 5. The mesh-like structural entity is composed of horizontal filaments of first susceptor material 11 and of vertical filaments of second susceptor material 12, or vice versa. In such an embodiment of the aerosol-forming material there usually would be no separate particulate second susceptor material 12.

While different embodiments of the invention have been described with reference to the accompanying drawings, the invention is not limited to these embodiments. Various changes and modifications are conceivable without departing from the overall teaching of the present invention. Therefore, the scope of protection is defined by the appended claims.

The invention claimed is:

1. A method for heating an aerosol-forming substrate to a predefined maximum temperature, the method comprising:

providing first and second susceptor materials each in thermal proximity to the aerosol-forming substrate, wherein the first and second susceptor materials are different from each other and have different geometrical configurations than one another;

inductively heating, by activating an inductive heating device, the first susceptor material such that the first susceptor material heats the aerosol-forming substrate to form an aerosol;

detecting a first phase-change of the second susceptor material, using the inductive heating device, during the inductive heating, the first phase-change occurring at the predefined maximum temperature; and responsive to detecting the first phase-change of the second susceptor material, stopping the inductive heating by deactivating the inductive heating device.

2. The method of claim 1, further comprising, subsequent to stopping the inductive heating:

allowing the second susceptor material to cool, a second phase-change of the second susceptor material occurring during the cooling;

detecting the second phase-change of the second susceptor material during the cooling; and responsive to detecting the second phase-change of the second susceptor material, activating the inductive heating device.

3. The method of claim 2, wherein the second phase-change comprises the second susceptor material reversibly changing from a paramagnetic phase to a ferromagnetic phase.

4. The method of claim 1, wherein the first phase-change comprises the second susceptor material reversibly changing from a ferromagnetic phase to a paramagnetic phase.

5. The method of claim 1, wherein one of the first and second susceptor materials distributed within the aerosol-forming substrate.

6. The method of claim 5, wherein the other of the first and second susceptor materials is located outside of the aerosol-forming substrate.

7. The method of claim 1, wherein at least one of the first and second susceptor materials is particulate.

8. The method of claim 1, wherein a concentration by weight of the second susceptor material is lower than a concentration by weight of the first susceptor material.

9. A system for heating an aerosol-forming substrate to a predefined maximum temperature, the system comprising:

an aerosol-forming article comprising the aerosol-forming substrate and first and second susceptor materials each in thermal proximity to the aerosol-forming substrate, wherein the first and second susceptor materials are different from each other and have different geometrical configurations than one another;

a cavity configured to receive the aerosol-forming article;

an inductive heating device; and circuitry operably coupled to the inductive heating device and configured to:

activate the inductive heating device so as to inductively heat the first susceptor material such that the first susceptor material heats the aerosol-forming substrate to form an aerosol;

detect a first phase-change of the second susceptor material during the inductive heating, the first phase-change occurring at the predefined maximum temperature; and responsive to detecting the first phase-change of the second susceptor material, deactivate the inductive heating device to stop inductively heating the first susceptor material.

10. The system of claim 9, the circuitry further being configured to, subsequent to stopping the inductive heating:

allow the second susceptor material to cool, a second phase-change of the second susceptor material occurring during the cooling;

detect the second phase-change of the second susceptor material during the cooling; and responsive to detecting the second phase-change of the second susceptor material, activate the inductive heating device.

11. The system of claim 10, wherein the second phase-change comprises the second susceptor material reversibly changing from a paramagnetic phase to a ferromagnetic phase.

12. The system of claim 9, wherein the first phase-change comprises the second susceptor material reversibly changing from a ferromagnetic phase to a paramagnetic phase.

13. The system of claim 9, wherein one of the first and second susceptor materials is distributed within the aerosol-forming substrate.

14. The system of claim 13, wherein the other of the first and second susceptor materials is located outside of the aerosol-forming substrate.

15. The system of claim 9, wherein at least one of the first and second susceptor materials is particulate.

16. The system of claim 9, wherein a concentration by weight of the second susceptor material is lower than a concentration by weight of the first susceptor material.

* * * * *